Patented Apr. 30, 1929.

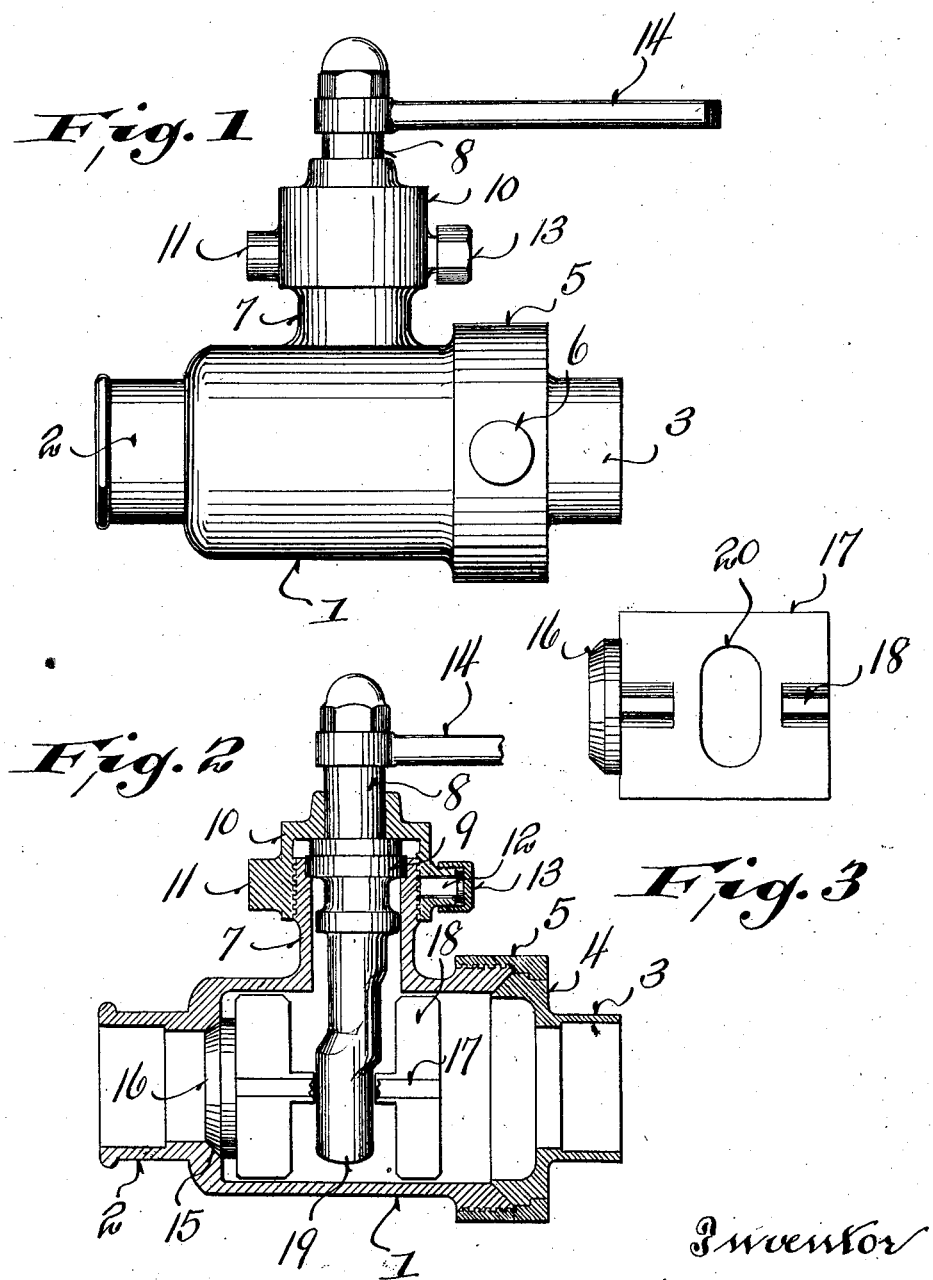

1,711,432

UNITED STATES PATENT OFFICE.

LARS C. THOMSEN, OF KENOSHA, WISCONSIN, ASSIGNOR TO TRI-CLOVER MACHINE CO., OF KENOSHA, WISCONSIN.

MILK VALVE.

Application filed February 21, 1927. Serial No. 169,884.

This invention relates to milk valves.

Objects of this invention are to provide a novel form of milk valve which is highly sanitary and may be easily taken apart for cleaning, and which is composed of the minimum number of parts.

Further objects are to provide a novel form of connection between the operating rod and the valve which dispenses with the use of links or other mechanism of this type, and which materially simplifies the construction.

In general this invention is an improvement over that disclosed in my prior Patent No. 1,552,094 of September 1, 1925, for milk valves.

An embodiment of the invention is shown in the accompanying drawings in which:

Figure 1 is a side view of the valve;

Figure 2 is a longitudinal sectional view;

Figure 3 is a plan view of the movable part or valve proper.

Referring to the drawings, it will be seen that the valve comprises a body portion or cylindrical member 1 which is equipped with an inlet 2, and an outlet 3. Preferably, the outlet 3 is carried by a head 4 held in place by a threaded sleeve or circular nut 5. Preferably, this nut is provided with projecting arms 6 so that it may be readily unscrewed when it is desired to open the valve up. The body portion is provided with a projecting part 7 through which the valve rod 8 extends. This valve rod is provided with a shouldered portion 9 held in place by the gland or nut 10, such gland or nut being provided with a projection 11 to facilitate its manipulation, and with a locking plunger 12 held in place by means of a screw head cap 13, similar to that described in my above noted patent. The valve rod is operated in any suitable manner, as by means of a handle 14.

The body portion is provided with a valve seat 15 with which a disc-like valve 16 cooperates. This disc-like valve is provided with an integral plate or fin 17 which, in turn, carries pairs of upwardly and downwardly projecting fins 18. The fins are guided within the cylindrical member and, consequently, guide the valve disc loosely within such member.

The valve rod is provided with an offset or eccentric portion 19 which constitutes a crank, and the plate 17 is provided with an elongated transverse slot 20 within which the crank works, so that rotation of the valve rod causes reciprocatory motion of the valve without the intervention of links or other mechanism of this type.

In reality, therefore, the moving parts of the valve consist substantially of only two parts, namely, the valve rod with its crank, and the valve proper with its integral plate cooperating with the crank.

It will be seen, therefore, that the valve is of the utmost simplicity and may be most easily made by ordinary machine shop processes.

Further, it will be seen that the valve may be readily disassembled for cleaning, as all parts are freely removable. The valve, as described in my above noted patent, does not necessitate the use of a stuffing box, as the integral collar 9 formed on the valve stem seats against a shouldered portion of the extension 7 and, consequently, secures a liquid-tight joint.

Although the invention has been described in considerable detail, such description is intended as illustrative rather than limiting as the invention may be variously embodied and as the scope of such invention is to be determined as claimed.

I claim:

A valve comprising a cylindrical casing having a valve seat, a movable member having a disc-like portion cooperating with said seat and having an integral transverse plate provided with a spaced pair of fins arranged at right angles to said plate, said fins and plate being guided within said cylindrical portion and said plate being provided with a transverse slot, and a valve rod having a crank located within said slot, said disc-like portion and said fins being carried wholly within said casing and the diameter of said disc-like portion being less than the internal diameter of said casing.

In testimony that I claim the foregoing I have hereunto set my hand at Kenosha, in the county of Kenosha and State of Wisconsin.

LARS C. THOMSEN.